June 13, 1944.  A. H. BAHNSON, JR  2,350,997
HUMIDIFIER UNIT
Filed Feb. 13, 1941  3 Sheets-Sheet 1

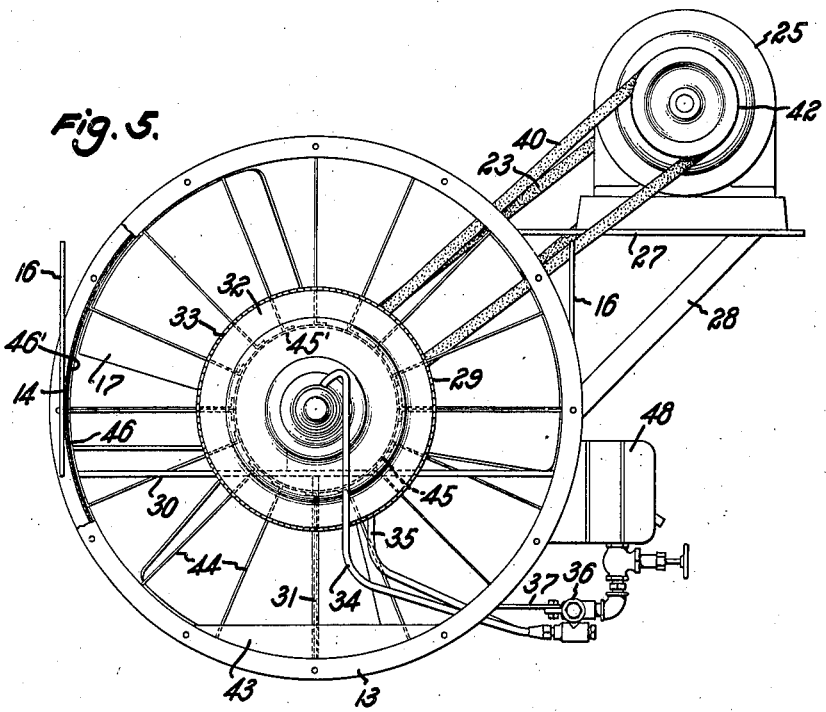

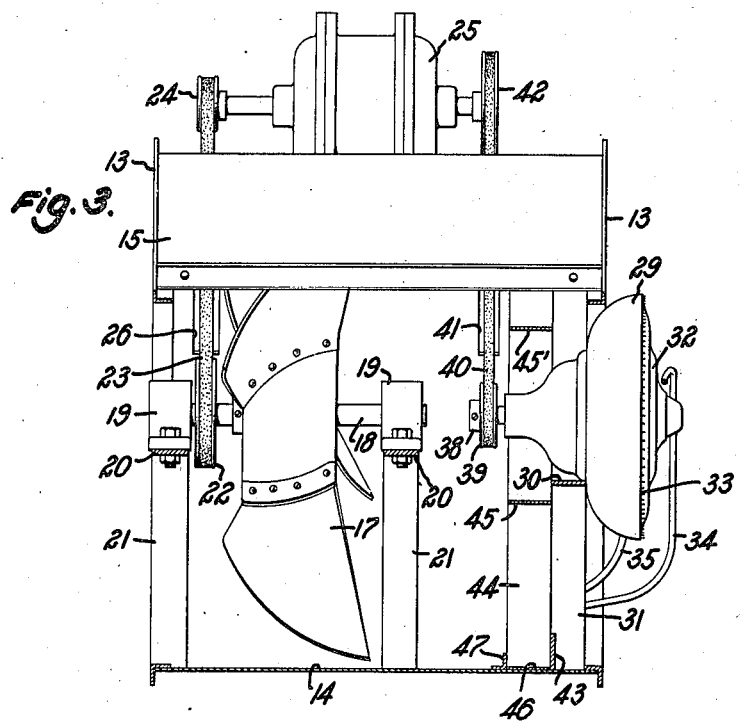
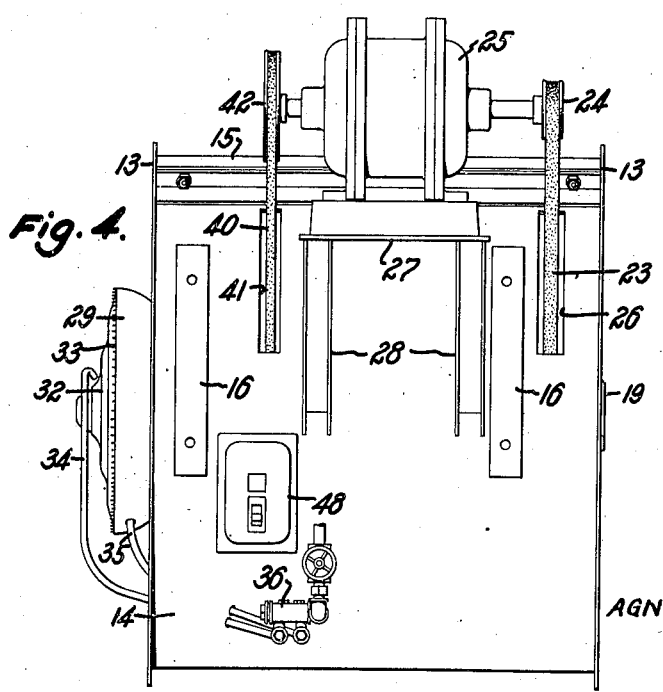

Inventor:
AGNEW H. BAHNSON JR.
By Potter, Pierce & Scheffler,
Attorneys.

Patented June 13, 1944

2,350,997

UNITED STATES PATENT OFFICE 2,350,997

HUMIDIFIER UNIT

Agnew H. Bahnson, Jr., Winston-Salem, N. C.

Application February 13, 1941, Serial No. 378,816

5 Claims. (Cl. 261—30)

This invention relates to humidifier units, and particularly to humidifier units for use in or forming parts of air conditioning apparatus of the "wet duct" type.

The humidifier units previously employed in such apparatus have comprised a fan and a water-throwing disk on a motor shaft and at opposite sides of the motor, the axis of the motor shaft coinciding with the axis of the duct. Humidifier units of this type can be designed to meet particular requirements for any given installation, but the effective output of a unit, in terms of the quantity of air circulated or of gallons of water evaporated per hour, could not be materially altered to meet different maximum demand condtions. Each wet duct humidifier installation was individually designed and any substantial change in the normal load on the apparatus usually resulted in inefficient operation or necessitated a replacement of the humidifier unit. Furthermore, the direct motor drive of the fan and disk gave rise to appreciable noise and vibration as the motor and fan were operated at relatively high speed to obtain good evaporative efficiency from the disk.

An object of the present invention is to provide a humidifier unit, for use in wet duct systems, that may be readily adjusted for efficient operation over wide ranges of air and of water outputs. An object is to provide a humidifier unit which includes an air circulating fan and a revolving disk that are driven by a common motor, and that may be individually operated at speeds that are best adapted for efficient fan and efficient revolving disk operation. A further object is to provide a humidifier unit, for use in wet duct installations, in which a low speed fan and high speed water-throwing disk are individually driven by belts from a motor that is mounted outside of the duct. More specifically, an object is to provide humidifier units such as stated above in which the low speed fan is of the type having a high efficiency when operated over a wide range of speeds corresponding to a wide range of output capacity, whereby the useful capacity of the unit may be changed by altering the speed ratio of the belt drive to the air circulating fan.

These and other objects and advantages of the invention will be apparent from the following specification when taken with the accompanying drawings in which:

Fig. 3 is a side elevation on an enlarged scale and partly in section, of the humidifier unit as it is seen in Fig. 2;

Fig. 4 is a similar side elevation of the humidifier unit as viewed from the opposite side of the duct system; and Figs. 5 and 6 are complementary end elevations of the humidifier unit.

Figure 1:
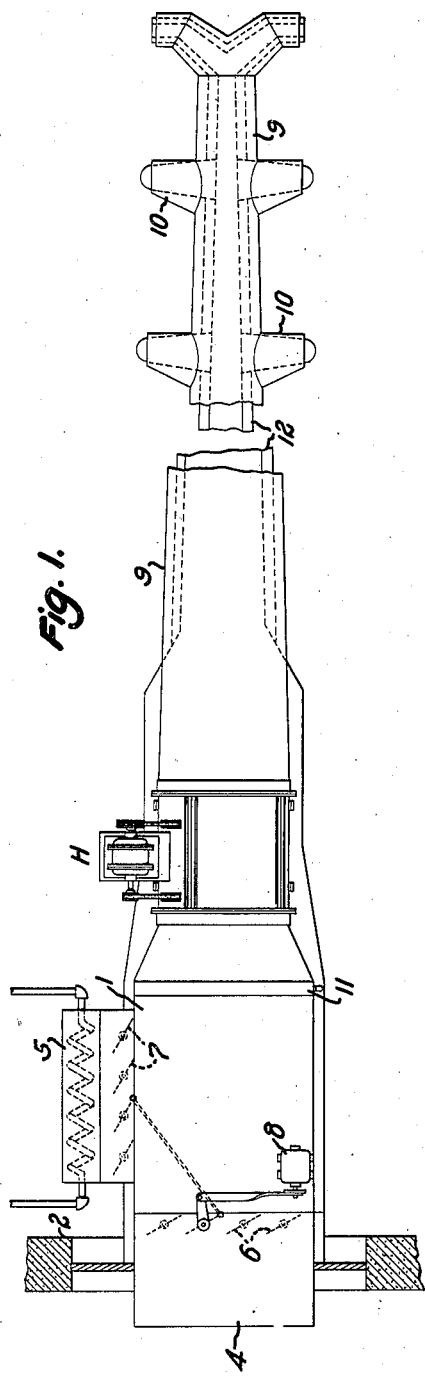
Fig. 1 is a fragmentary plan view of a wet duct air conditioning system including a humidifier unit embodying the invention.
Figure 2:
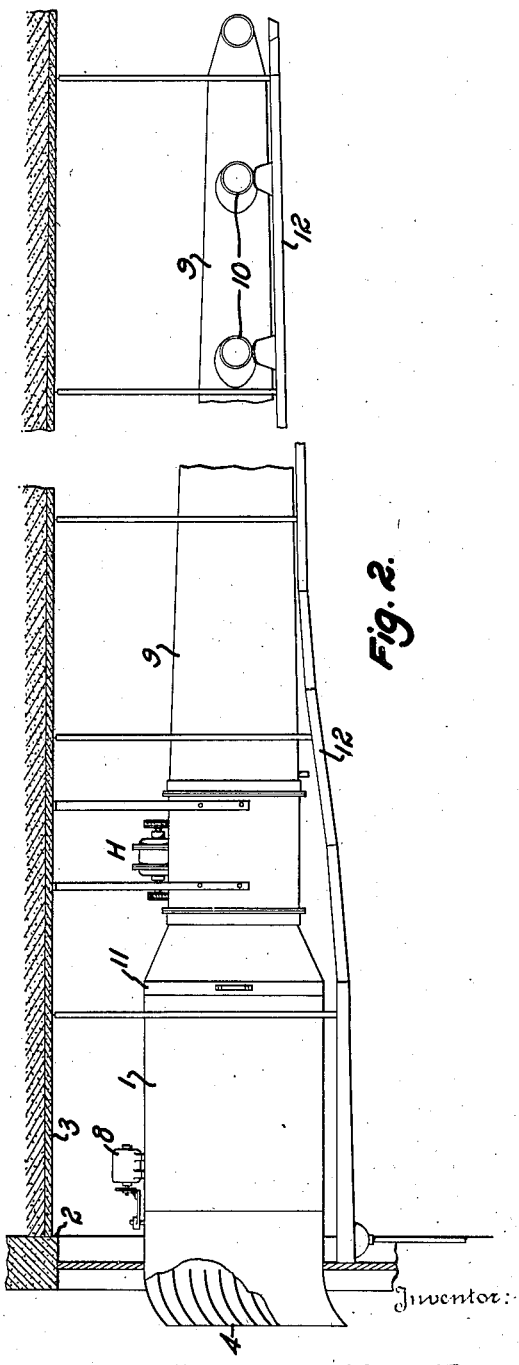
Fig. 2 is a side elevation of the same.

In Figs. 1 and 2, which illustrate one duct of an air conditioning system, the reference numeral 1 identifies the mixing chamber of the duct that is located adjacent an outside wall 2 and the ceiling 3 of the room or mill space in which the air is to be conditioned. The chamber 1 has an inlet 4 for outside air and an inlet for air that is drawn from the room. A heating section 5 is preferably arranged at the recirculated air inlet and louvres 6, 7 are provided at the fresh air and recirculated air inlets, respectively, to control the relative quantities of these air components. A modulating motor 8 adjusts the louvres in response to temperature and/or humidity control devices, not shown, within the room in the usual manner. The humidifier unit H of this invention is located between the mixing chamber 1 and the duct 9 that extends across the room and has outlet nozzles 10 that may extend from one side or, as illustrated, from both sides of the duct. A filter screen 11 may be placed between the mixing chamber 1 and the humidifier unit H, and a trough or drip pan 12 extends beneath the duct and mixing chamber to collect water that condenses upon the relatively cool duct when a high humidity is maintained within the room. The duct section in advance of the humidifier has a drain pipe or opening to discharge to the drip pan all water that separates from the air stream within the duct 9.

The humidifier unit H includes a duct section comprising annular end frames 13 of angle cross section to which a sheet metal plate 14 is permanently attached, as by welding, and to which another plate 15 may be clamped, by bolting to the flanged edges of plate 14, to form a housing connecting the mixing chamber 1 to the duct 9. The removable cover plate extends over an arc of about 90°, and the fixed housing plate 14 extends over about 270° of the circumference of the housing. Straps 16 are welded to opposite sides of the metal plate 14 for connection to the hangers that support the humidifier unit from the ceiling of the room.

A fan 17 of the type having a high efficiency over a wide range of speeds and a correspondingly wide range of output capacity is rotatably supported at the air inlet end of the housing section by a shaft 18 that is journalled in bearings 19 on cross bars 20 that are braced beneath the bearings by vertical struts 21, the cross bars and struts being welded to each other and to the housing. A pulley 22 is secured to shaft 18 and connected by a belt 23 to the pulley 24 on one end of the shaft of a motor 25. The belt extends through an opening 26 in the plate 14, and the motor is secured to an exterior platform or metal plate 27 that, with its supporting braces 28, is welded to the plate 14 of the housing.

The casing 29 of the water-atomizing element is supported on a cross bar 30 and strut 31 that are welded to the housing. This element includes a revolving disk 32 and an atomizer ring 33, and water is fed to opposite sides of the disk through pipes 34, 35 that are connected to a water supply pipe through a filter unit 36 that is supported from the housing by a strap 37. The water-atomizing element may be, and preferably is, of a known design, such as described in the patent to Jerry H. Simpson, No. 1,966,872, with an imperforate casing 29 that extends around the edge of the disk 32 and is spaced radially from the teeth of the atomizer ring 33. A water-atomizing device of this type discharges a mist or cloud of fine water particles into the air stream without imparting an angular component or "spin" to the air stream. In accordance with this invention, the quantity of water and the volume of air may be independently adjusted, and this operating characteristic is obtained by driving the pulley 39 on the disk-carrying shaft 38 through an independent belt connection 40 to the motor shaft. The drive belt 40 extends through the opening 41 in the housing plate 14 and is driven by a pulley 42 on the motor shaft.

The disk 32 projects into the duct section 9, and a dam or baffle plate 43 is welded across the bottom of the humidifier unit housing to prevent the non-evaporated water from flowing rearwardly through the humidifier housing to the filter and air inlet sections of the duct. A rotary component is imparted to the air stream by the fan 17, but this is eliminated by a series of radial vanes 44 that, in two complementary groups, are welded to inner and outer semi-circular members 45, 45' and 46, 46', respectively, the outer members 46, 46' fitting snugly within the housing and being anchored against axial displacement by small angle members or stops 47 welded to the housing plate 14.

The electrical connections to the motor 25 may be of any desired type for a manual or automatic control of the humidifier unit. In general, it is desirable to operate the fan 17 continuously during periods when air conditioning is desired and to control the effective humidifier action by a regulating of the water supply to the disk 32 by humidity control apparatus of known or desired type. A switch or control box 48 for the motor circuit may be welded to the humidifier unit housing.

The humidifier unit operation is of course similar to that of prior devices in which the fan and water-throwing disk were directly attached to the motor shaft. The present invention has a number of advantages over the prior direct motor drive systems. The fan and disk may be driven at different speeds, and at different speed ratios, by a selection of the diameters of the pulleys of the belt drive systems. The fan will be operated at a relatively low speed to avoid noise and vibration, and the disk will be operated at a relatively high speed for efficient atomization of the water. There is a definite limit to the increase in evaporative capacity at increasing disk speeds but increased efficiency at all evaporative capacities below the maximum value may be obtained by adjusting the disk speed to that value which corresponds to the desired evaporative capacity. The volume of air discharged from the duct system may be varied over wide limits, without substantial variation in operating efficiency, by a selection of the fan speed. The water-atomizing device does not impart an angular component to the air stream as it passes over the edge of the casing 29. The multiplicity of vanes 44 remove the angular component imparted to the air stream by the fan 17, and high evaporative efficiency is thus attained as the air stream moves axially along the duct 9. The water particles are not thrown from the air stream by centrifugal action but are carried down the duct by the air stream, and only the larger water particles are not completely evaporated before they contact the duct wall.

The pulleys are preferably of the variable pitch type to provide a substantial range of adjustment of the fan and the disk speeds after the installation of the equipment. In the event of subsequent changes in the mill structure that materially alter the design requirements, the pulleys may be readily replaced by others that provide new ranges of fan and disk speeds to meet the changed design requirements and, if necessary, the motor may be replaced by one of larger size.

The individual belt drives thus permit operation at high efficiency over a relatively wide range of the capacities of the fan and humidifier disk, and the manufacture of humidifier units for wet duct systems can be standardized on a relatively few stock models that may be adapted to the design requirements for a given installation by a selection of a motor of adequate power and belt drives of the appropriate speed ratios. It is of course desirable to install the largest size unit that will satisfy the particular design requirements to obtain the benefit of the maximum additional capacity if the load demand is subsequently increased.

The following data is indicative of an appropriate design for a humidifier unit, but it is to be understood that the invention is not limited to any particular dimensional and speed values. In one typical installation, the fan 17 had a diameter of 30″, and would deliver from 5500 to 8000 cubic feet per minute when operated at speeds of from 925 to 1510 revolutions per minute by a motor 25 of two horsepower. A larger fan unit, for example a fan of 33″ diameter, would operate at somewhat higher efficiency and at a lower speed for the same output. Fan speeds of this order reduce the noise of operation to a low level. The disk element 32 had a diameter of 14⅝″ and, when operated at speeds of from 3500 to 5000 revolutions per minute from the same motor 25, evaporated from 23 to 27 gallons of water per hour into an entering air stream having a temperature of about 96° and a relative humidity of 30%.

The invention is not restricted to the values stated and it is to be understood that various changes may be made in the illustrated construction without departure from the spirit of my invention as set forth in the following claims.

I claim:

1. In a humidifier unit for a wet duct humidifier system, a housing comprising annular end frames, a housing plate permanently attached to said frames, a removable cover plate detachably secured to said frames and flanges on said first plate, a skeleton framework secured to said housing, fan shaft bearings on said framework, a fan shaft journalled in said bearings, a fan and a pulley on said shaft, a motor and means supporting the same upon the housing, a belt drive coupling said motor to said fan shaft, water-atomizing means including a rotatable disk on a shaft, means supporting said disk shaft within said housing, a pulley on said disk shaft, and a belt drive coupling said disk shaft to said motor.

2. In a humidifier unit for a wet duct humidifier, a fan shaft and a disk shaft individually journalled within and axially of the housing, said fan shaft being at the air entrance end of the housing, pulleys on said shafts, a motor and belt drives cooperating with said pulleys to operate said fan shaft at a lower speed than said disk shaft, a fan on said fan shaft, a water-throwing disk on said disk shaft, and means within said housing between said fan and disk to eliminate the rotary component imparted to the air stream by said fan; said means comprising a pair of complementary baffle members each comprising a semi-circular inner and outer member, and radial vanes extending between and secured to said members.

3. In a humidifier system, an elongated duct having an inlet at one end for relatively dry air and having spaced discharge outlets at the other end, a fan within the duct adjacent the inlet end to establish a current of air through the duct, water-atomizing means within the duct and at the outlet side of said fan to introduce a mist of water into the air current, said means being of the type that imparts no angular component to the current of air, a plurality of groups of vanes between said fan and said water-atomizing means to eliminate from the air current approaching the water-atomizing means the rotary component imparted thereto by said fan, and means individual to each group of vanes for supporting the same within said duct.

4. In a humidifier system, the invention as recited in claim 3, wherein the duct is cylindrical, and the supporting means for each of the groups of vanes comprises an inner and an outer arcuate member secured to the vanes of that group.

5. In a humidifier system, the invention as recited in claim 3, wherein said duct is cylindrical, and there are two complementary groups of vanes.

AGNEW H. BAHNSON, Jr.